（12) United States Patent
Orrigoni

(10) Patent No.: US 9,669,854 B2
(45) Date of Patent: Jun. 6, 2017

(54) CART FOR THE TRANSPORT OF MATERIALS

(71) Applicant: Dante Bertoni S.r.l., Cairate VA (IT)

(72) Inventor: Valentino Orrigoni, Legnano MI (IT)

(73) Assignee: Dante Bertoni S.r.l., Cairate (VA) (IT)

( * ) Notice: Subject to any disclaimer, the term of this patent is extended or adjusted under 35 U.S.C. 154(b) by 0 days.

(21) Appl. No.: 15/265,201

(22) Filed: Sep. 14, 2016

(65) Prior Publication Data

US 2017/0080964 A1 Mar. 23, 2017

(30) Foreign Application Priority Data

Sep. 22, 2015 (IT) ........................ 102015000053918

(51) Int. Cl.
*B62B 3/02* (2006.01)
*B62B 3/00* (2006.01)

(52) U.S. Cl.
CPC .............. *B62B 3/002* (2013.01); *B62B 3/008* (2013.01); *B62B 2301/04* (2013.01)

(58) Field of Classification Search
CPC ......... B62B 3/002; B62B 3/003; B62B 3/008; B62B 3/02; B62B 3/022; B62B 3/027; B62B 2301/04
USPC ................................ 280/35, 659, 79.11, 79.2
See application file for complete search history.

(56) References Cited

U.S. PATENT DOCUMENTS

| 8,042,706 B2 * | 10/2011 | Orrigoni | ................ | F16B 5/121 |
| | | | | 220/642 |
| 2008/0111332 A1 * | 5/2008 | Nabata | .................. | B62B 5/0093 |
| | | | | 280/79.11 |

FOREIGN PATENT DOCUMENTS

| DE | 9312534 U1 | 12/1993 |
| DE | 9408882 U1 | 8/1994 |
| WO | 9101098 A1 | 2/1991 |
| WO | 2008015711 A1 | 2/2008 |

OTHER PUBLICATIONS

European Search Report for European Application No. EP 16189303 (Nov. 8, 2016) (5 pages).

* cited by examiner

*Primary Examiner* — John Walters
(74) *Attorney, Agent, or Firm* — Lucas & Mercanti, LLP

(57) ABSTRACT

The invention relates to a cart for the transport of materials, said cart comprising a base stretching out in a longitudinal direction (L) and in a transverse direction (T) that are mutually perpendicular and a peripheral wall extending from said base in a vertical direction (V) perpendicular to said longitudinal direction (L) and said transverse direction (T). The base comprises a plurality of cross members extending between opposite sides of a rounded profile mounted on a lower edge of said peripheral wall, said cross members being restrained thereto at their ends by way of mounting means. Each cross member comprises a profiled bar that has a longitudinal through cavity and a pair of connecting elements that are telescopically fitted in said longitudinal through cavity and protrude from its ends, said connecting elements being provided with respective attachment means arranged at their respective free ends facing said rounded profile, said attachment means being configured to match the rounded profile.

5 Claims, 3 Drawing Sheets

CART FOR THE TRANSPORT OF MATERIALS

CROSS-REFERENCE TO RELATED APPLICATIONS

This application claims the benefit of Italian Patent Application No. 102015000053918 filed Sep. 22, 2015, the contents of which are incorporated herein by reference.

FIELD OF THE INVENTION

The present invention generally relates to means for the transport of materials and in particular to a cart suitable for this purpose.

BACKGROUND OF THE INVENTION

In industrial plants such as e.g. industrial laundries, textile facilities and the like, it is known to use carts for the transport of materials. These carts generally comprise a base and a peripheral wall restrained thereto. Carts for the transport of materials are also generally provided with a plurality of fixed or swivel wheels mounted on the base. A cart for the transport of materials may have various shapes depending on the intended use, for example a polygonal or cylindrical shape. Still depending on the use, the various parts of the cart may be made of different materials, such as, for example, galvanized steel, aluminum, thermoplastic materials and the like. Thermoplastic materials are currently highly employed because they are very cheap and long lasting. Carts made of structurally similar materials are also commonly employed in hotels, hospitals, and communities, for example for the transport of linen to the floors of a hotel or for delivering and collecting materials such as pillows and blankets in airplanes. These carts have a peripheral wall made of a thermoplastic material on whose upper and lower edges respective rounded profiles are fitted and secured. The rounded profiles serve as stiffening means of the cart structure, as well as aesthetic finishing elements. The upper profile also provides an operator with a secure grip when maneuvering the cart, while the lower profile is used to anchor a bottom wall on which the wheels are mounted.

Profiles that are typically used for these purposes are e.g. manufactured by starting from sheet metal plates that are folded so as to achieve a U shape in cross section and that are fixed along the edges of the peripheral wall by way of screws, bolts or rivets.

The base of these carts comprises a plurality of cross members that stretch out between opposite sides of the lower profile and are restrained thereto at their ends. The cross members are generally configured as box-shaped elements that are manufactured by starting from sheet metal plates that are subjected to subsequent cutting and bending operations. The ends of the cross members are shaped so as to match the profile on which they are intended to be fixed, for example they are curved so as to have the shape of a cradle. In order to provide the cross members with a rigidity adequate to the loads and stresses a cart will be subjected during use, further box-shaped elements that are suitably cut, folded and fixed by welding or riveting are employed to reinforce the cross members.

Due to the large number of cutting, bending and assembly operations, the manufacturing of cross members intended to be the supporting elements of the base of a cart of the type described above is rather long and expensive, therefore not suitable for the manufacturing of small groups of carts.

On the other hand, the field of the carts for the transport of materials features a very low level of standardization due to the different uses they are intended to, which determines structures having an extremely variable size and a loading capacity, as well as peripheral profiles and walls that are made of different materials and have various shapes. As a matter of fact, the overall structural configuration must be chosen on a case by case basis.

A further problem of the carts for the transport of materials is that the box-shaped elements used to manufacture the cross members are affected by machining tolerances that are typical of the metallic carpentry, which can make it difficult to assemble them onto the rounded profiles mounted on the lower edge of the peripheral wall of a cart. The peripheral wall in fact is subject to cutting and bending operations as well and thus similarly features the typical tolerances of carpentry.

SUMMARY OF THE INVENTION

There is therefore the need to improve the carts for the transport of materials from a structural and an assembly point of view, which is an object of the present invention.

Said object is achieved with a cart whose main features are specified in the first claim, while other features are specified in the remaining claims.

An idea of solution underlying the invention is to manufacture the cross members forming the base of a cart for the transport of materials by using profiled bars having respective longitudinal through cavities, and to mount on each profiled bar a pair of connecting elements that are telescopically fitted in its longitudinal through cavity. The connecting elements protrude from the opposite ends of the profiled bars and comprise respective attachment means to be mounted on the lower profile surrounding the peripheral wall of the cart.

Thanks to these features, it is possible to make extensible cross members that allow to compensate machining tolerances of the various parts that form a cart, thereby making assembly operations, as well as adaptation to different dimensional cart types, easier. The extensible configuration of the cross members in fact also allows to use a same cross member for a number of different carts, which allows to standardize this component.

The profiled bars advantageously comprise a plurality of longitudinal grooves formed on their opposite faces and configured for the mounting of wheels. These grooves are spaced apart so as to define on each face of the profiled bar a plurality of different pitches adapted to receive wheels having mounting holes with different center-to-center distances. Thanks to this feature, it is possible to use a same profiled bar, and therefore a same cross member, for more wheel types, which contributes to the component standardization the cart according to the invention allows to achieve.

A further advantage offered by the cart according to the invention is that the high degree of standardization of its components allows to reduce manufacturing and assembly times and the related costs. Thanks to these features, the carts of the invention can be supplied to the end user even in a disassembled condition and can be easily assembled at the final destination, thus saving space for the benefit of transport and handling costs.

BRIEF DESCRIPTION OF THE DRAWINGS

Further advantages and features of the cart according to the present invention will become clear to those skilled in the art from the following detailed and non-limiting description of embodiments thereof with reference to the accompanying drawings in which.

DETAILED DESCRIPTION OF THE INVENTION

Figure 1:
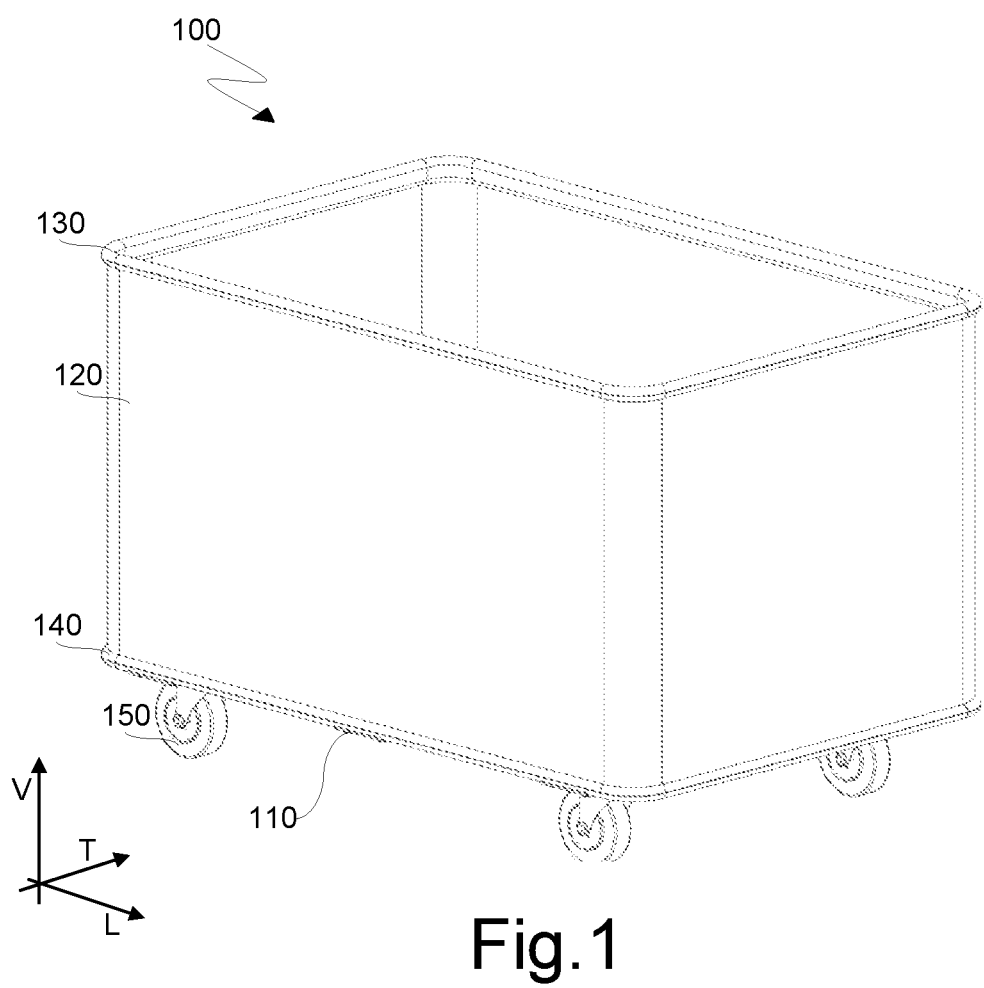
FIG. 1 is a top perspective view that shows a cart according to the present invention.
Figure 2:
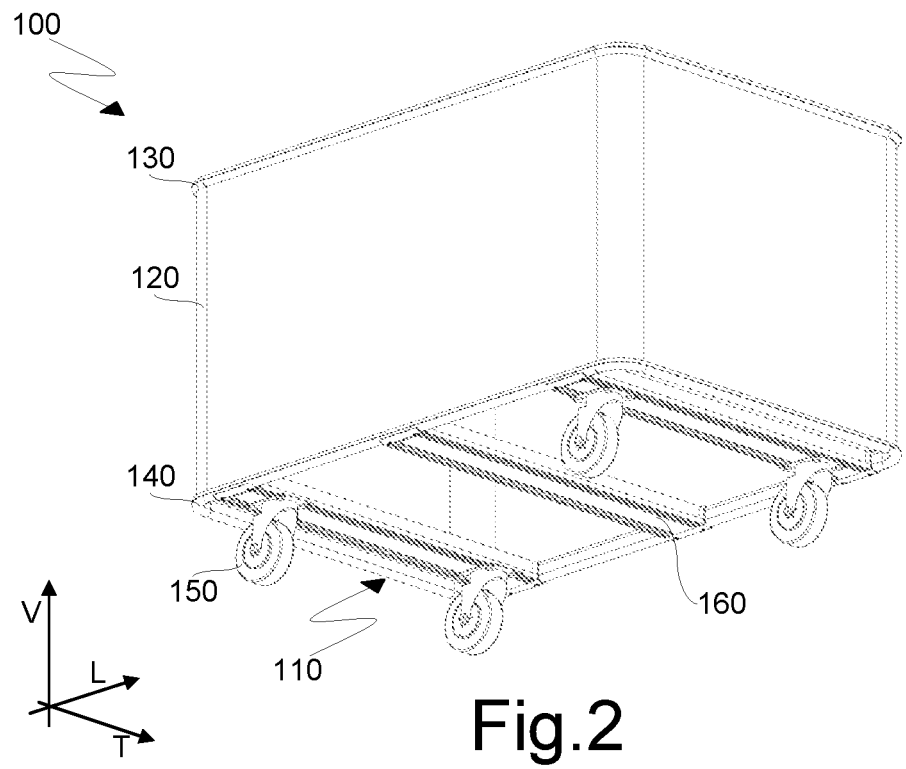
FIG. 2 is a bottom perspective view of the cart according to the present invention.

Referring to FIGS. 1 and 2, a cart according to the invention for the transport of materials is generally indicated at 100 and is shown in a three-dimensional reference system, wherein a base 110 of the cart extends in a longitudinal direction L and transverse direction T perpendicular to each other and a peripheral wall 120 of the cart stretches out the base 110 in a vertical direction V, perpendicular to the longitudinal direction L and to the transverse direction T.

The peripheral wall 120, preferably made of a thermoplastic material, comprises rounded profiles 130, 140 that are respectively restrained to its upper and lower edges in the vertical direction V. Fastening means suitable for the mounting of the profiles 130, 140 on the peripheral wall 120 are e.g. screws, bolts or, preferably, rivets.

The cart 100 also comprises a plurality of wheels 150, e.g. swivel wheels, restrained to the base 110. As shown in FIG. 2, the base 110 comprises a plurality of cross members 160, three in the embodiment shown in the figures, which e.g. extend in the transverse direction T between opposite sides of the profile 140 mounted on the lower edge of the peripheral wall 120 and are restrained thereto at their ends by fixing means such as those mentioned above. Depending on transportation needs, a panel (not shown) may be placed on the cross members 160, for example a panel made of the same thermoplastic material of which the peripheral wall 120 is made, which covers the whole area defined by the latter thus forming a bottom wall of the cart 100.

Figure 3:
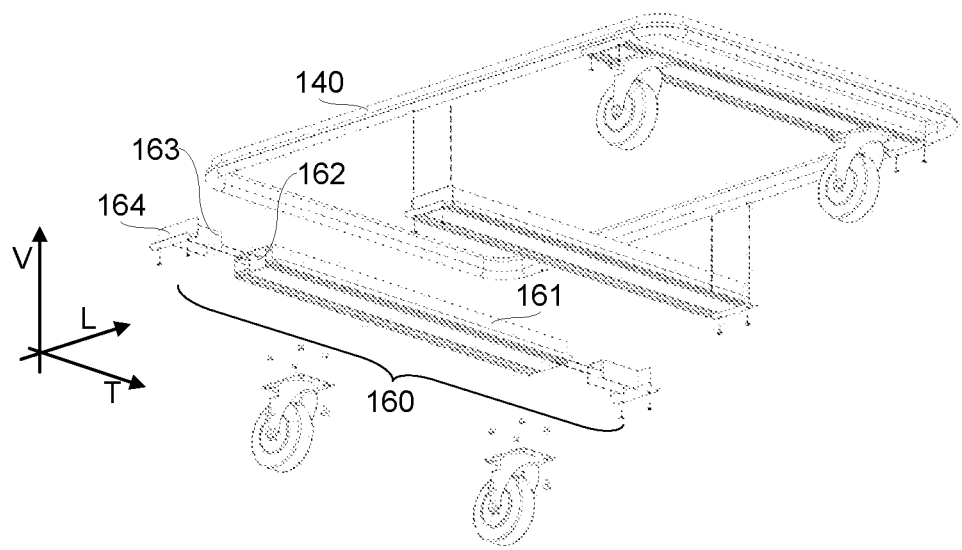
FIG. 3 is a bottom, partially exploded perspective view showing a base of the cart according to the present invention.
Figure 4:
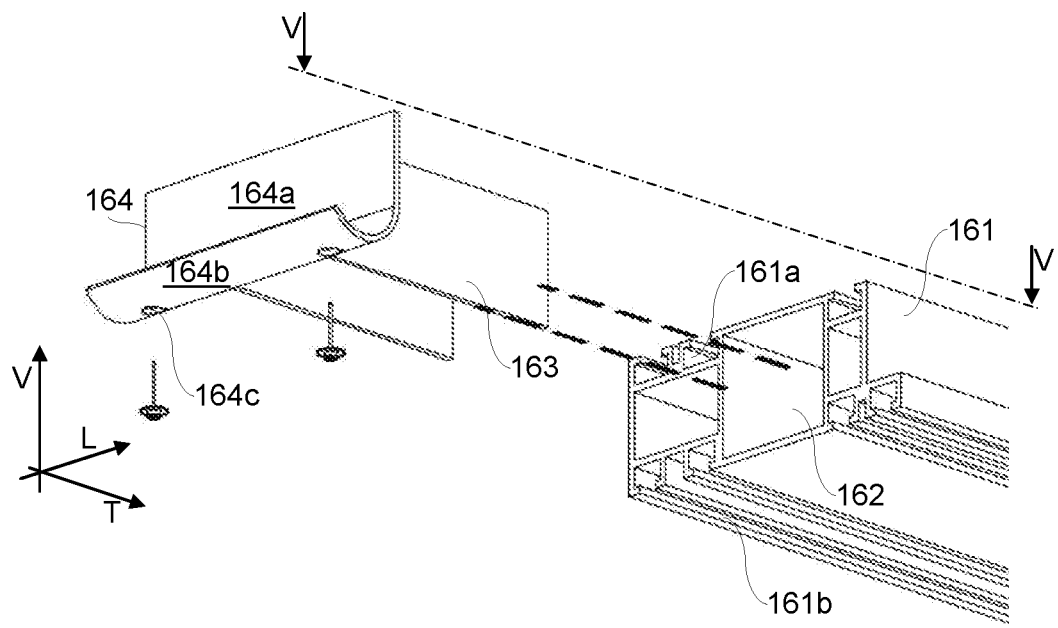
FIG. 4 is a perspective view showing a detail of FIG. 3.

Now referring to FIGS. 3 and 4, according to the invention each cross member 160 comprises a profiled bar 161, e.g. made of aluminum, which has a longitudinal through cavity 162, as well as a pair of connecting elements 163 that are telescopically fitted in the longitudinal through cavity 162 of the profiled bar 161 and protrude from its opposite ends.

The longitudinal through cavity 162 has for example a square shape in cross section and the connecting elements 163 have a cross-section of a matching shape and size.

The connecting elements 163 comprise respective attachment means 164 that are arranged such that their respective free ends face the profile 140 mounted on the lower edge of the peripheral wall 110 of the cart 100 and that are configured to allow mounting of the cross members 160 thereon. To this aim, the attachments means 164 include a flat portion 164a restrained to the respective connecting element 163 and a curved portion 164b whose curvature corresponds to the curvature of the profile 140.

Assembly of the attachment means 164 to the profile 140 is carried out by way of screws, bolts or, preferably, rivets, as indicated above, and to this aim holes 164c are formed in the curved portion 164b.

The telescopic coupling between the connecting elements 163 and the profiled bars 161 allows to achieve extensible cross members 160 that can compensate machining and assembly tolerances of the components of the cart, thereby facilitating its assembly operations.

In addition to this, the extensible configuration of the cross members allows to use a same cross member 160 for a number of cart types having a different size, thus providing the advantage to achieve a range of carts that employ standardized components.

The connecting elements 163 and the respective attachment means 164 can be manufactured by starting from a single sheet metal plate by way of simple cutting and bending operations.

Alternatively, the connecting elements 163 can be manufactured by employing profiled bars similarly to the profiled bars 161, and the attachment means 164 may be obtained by starting from flat sheet metal plates suitably curved so as to form the respective curved portions 164b. In this case fastening of the connecting elements 163 to the attachment means 164 may for example be made by welding or technically equivalent solutions. The connecting elements 163 may alternately be formed as single pieces by resorting to aluminum die-casting.

As shown in FIGS. 2 to 4, the profiled bars 161 comprise a plurality of longitudinal grooves 161a, 161b formed on opposite faces in the vertical direction V. With particular reference to FIG. 4, each groove features a narrower the cross section in correspondence of the respective longitudinal aperture facing the top or bottom face of each profiled bar 161, which allows assembly of studs or nuts for the mounting of the wheels 150.

According to the invention, the longitudinal grooves 161a, 161b are spaced apart on each face so as to create a range of different pitches suitable to allow fitting of different types of wheels, having mounting holes with different center-to-center distances. Depending on the type of wheels chosen for a specific cart, the profiled bars 161 will therefore be oriented so that the face having the grooves with the desired pitch faces downwards in the vertical direction V.

It will be appreciated that the orientation of the profiled bars 161 with respect to the vertical direction V does not influence the assembly of the connecting elements 163 at all, because they can be fitted into the longitudinal through cavity 162 in either direction.

According to a preferred embodiment of the invention, the rounded profiles 130, 140 are identical to one another and correspond of the profiles disclosed in the European patent 2047121 granted to the applicant.

Figure 5:
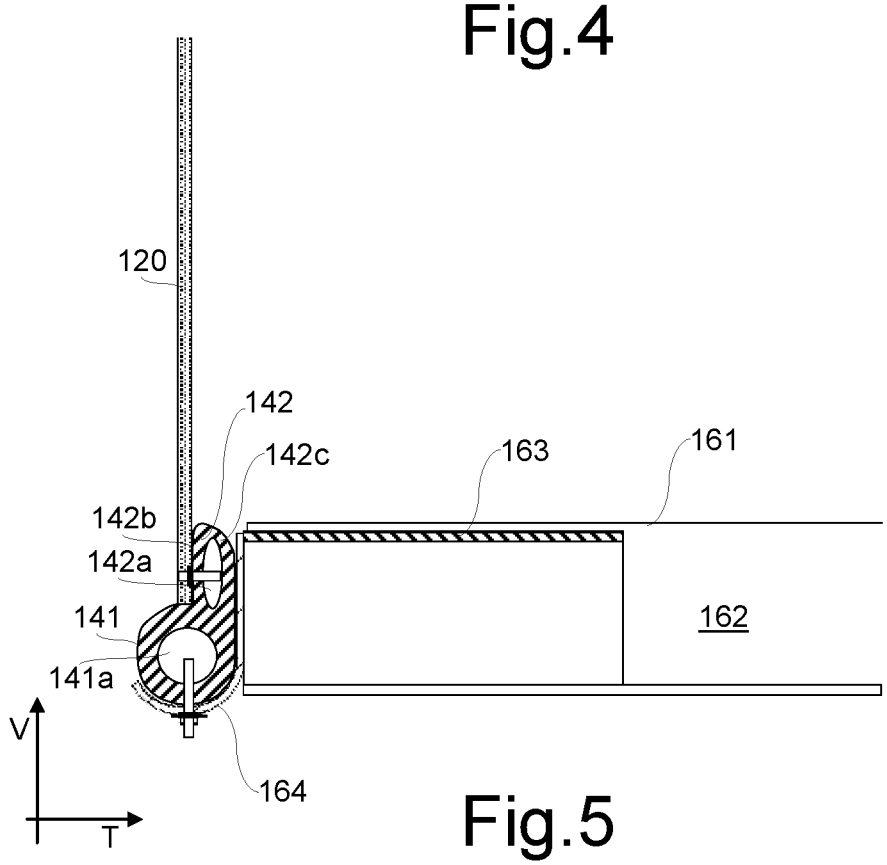
FIG. 5 is a partial view of the cart in cross-section taken along one of the cross members that form its base.

Referring to the cross section of FIG. 5, which shows the profile 140 fixed to the lower edge of the peripheral wall 120 of the cart 100, this profile comprises a first portion 141 having a rounded shape wherein a first longitudinal cavity 141a is formed, and a second portion 142, which extends tangentially from the first rounded portion 141 and wherein a second longitudinal cavity 142a is formed.

The second portion 142 includes a first straight wall 142b that forms with the first rounded portion 141 a seat adapted to receive a panel of the peripheral wall 120 of the cart 100. The second portion further comprises a second wall 142c having a curvilinear shape, which is connected to the first rounded portion 141.

Thanks to the use of this type of profile it is possible to hide in the cavities 141a and 142a the ends of the screws, bolts or rivets that are employed for the assembly of the cross members 160 and of the peripheral wall 120 of the cart 100, that would otherwise protrude inside the cart 100.

The present invention has been described with reference to preferred embodiments thereof. It will be appreciated that there may be further embodiments relating to the same inventive idea as defined by the scope of protection of the claims set forth below.

The invention claimed is:

1. A cart for the transport of materials, said cart comprising a base stretching out in a longitudinal direction (L) and in a transverse direction (T) that are mutually perpendicular and a peripheral wall extending from said base in a vertical direction (V) perpendicular to said longitudinal direction (L) and said transverse direction (T), wherein the base comprises a plurality of cross members extending between opposite sides of a rounded profile mounted on a lower edge of said peripheral wall, said cross members being restrained thereto at their ends by way of mounting means, characterized in that each cross member comprises a profiled bar that has a longitudinal through cavity and a pair of connecting elements telescopically fitted in said longitudinal through cavity and protruding from its ends, said connecting elements being provided with respective attachment means arranged at their respective free ends facing said rounded profile, said attachment means being configured to match the rounded profile.

2. A cart according to claim 1, wherein said attachment means comprise a flat portion restrained to the respective connecting element and a curved portion whose curvature corresponds to the curvature of the rounded profile.

3. A cart according to claim 1, wherein said profiled bar further comprises a plurality of longitudinal grooves formed on its opposite faces in the vertical direction (V) and configured to allow mounting of wheels of the cart, wherein the cross section of each longitudinal groove narrows at the respective opening facing the top face or the bottom face of the profiled bar.

4. A cart according to claim 3, wherein the longitudinal grooves are mutually spaced apart on each face of the profiled bar so as to create a range of different mutual distances for the mounting of wheels having assembly holes with different pitches.

5. A cart according to claim 1, wherein the rounded profile mounted on a lower edge of the peripheral wall comprises a first portion having a rounded shape wherein a first longitudinal cavity is formed and a second portion extending tangentially from said first rounded portion and wherein a second longitudinal cavity is formed, and wherein said second portion comprises a first straight wall that forms with the first rounded portion a seat adapted to receive a panel of the peripheral wall of the cart, and a second wall having a curvilinear shape, which is connected to the first rounded portion.

* * * * *